United States Patent [19]
Lehman

[11] Patent Number: 5,972,479
[45] Date of Patent: Oct. 26, 1999

[54] CAMOUFLAGE CONFIGURATION

[76] Inventor: Victoria L. Lehman, 1970 240th Ave., Luck, Wis. 54853

[21] Appl. No.: 08/749,897

[22] Filed: Nov. 18, 1996

[51] Int. Cl.[6] ....................................................... B32B 9/00
[52] U.S. Cl. ........................... 428/195; 428/81; 428/137; 428/187; 428/190; 428/207; 428/919; 430/394; 395/109; 345/113; 345/114; 358/515; 358/537
[58] Field of Search .............................. 428/919, 81, 195, 428/207, 137, 187, 190; 283/94; 427/258; 430/394, 644; 358/515, 537, 540; 156/61; 2/69, 900, 1; D5/32, 62; D25/138; 345/113, 114; 395/109

[56] References Cited

U.S. PATENT DOCUMENTS

| | | | |
|---|---|---|---|
| 4,420,175 | 12/1983 | Mowry, Jr. .................................. | 283/93 |
| 4,576,904 | 3/1986 | Anitole ..................................... | 430/347 |
| 4,811,089 | 3/1989 | Kiser et al. ................................ | 358/75 |
| 5,565,994 | 10/1996 | Eschbach ................................. | 358/298 |

*Primary Examiner*—Deborah Jones
*Assistant Examiner*—Abraham Bahta
*Attorney, Agent, or Firm*—Nawrocki, Rooney & Sivertson, P.A.

[57] ABSTRACT

A method of forming a camouflage pattern, a method of manufacturing a camouflage material in accordance with the pattern, and a camouflage material so manufactured. The method is performed by the taking of a series of photographs in a setting in the environment in which the camouflage configuration is intended to be used. One typical environment might include oak, poplar and birch trees. The individual images of the photographs are then entered graphically into a computer. The computer images are then overlain, one upon another, to form a composite print. Using the computer, the colors in the composite print are separated into a plurality of color prints portraying the predominant colors in the composite print. The colors are identified, and a corresponding plurality of layer screens based upon the individual color prints are made. The layer screens are then employed to screen the identified colors onto a sheet of material.

6 Claims, 7 Drawing Sheets

5,972,479

CAMOUFLAGE CONFIGURATION

TECHNICAL FIELD

The present invention deals with camouflage materials and methods for forming such materials. More specifically, however, the invention deals with methods for forming a camouflage pattern simulating an environment having oak, poplar and birch trees, and forming a camouflage material based upon the patterns so formed. The preferred embodiment of the invention focuses upon coloration and the structure of a composite camouflage sheet having different color layers laminated thereon.

BACKGROUND OF THE INVENTION

Camouflage materials have numerous applications. Certainly there is a military application. Beyond that, however, applications exist for hunting and other endeavors wherein it is necessary to maintain one's self blended into the environment and undetected.

Various types of camouflage backgrounds are applicable. The particular type of background, of course, hinges upon the environment in which the material is intended to be used. Such environments might include snow, desert, woods, and possibly swamp.

The particular environment can be broken down even further and the camouflage material be made more specific. For example, in the case of a woods environment, the camouflage material can be constructed depending upon the particular type of foliage present in the area in which the material is intended to be used. In various locations throughout the United States and various other countries, a common mix of trees is oak, poplar and birch.

Simulation of environment is a function not only of coloration, but also of specific portrayal of coloration and stacking or overlaying of color layers. It is, of course, important to consider all of these factors in order to most effectively simulate a particular environment.

It is to these problems and dictates of the prior art that the present invention is directed. It is an improved method for forming a camouflage pattern simulating an oak, poplar and birch environment, a method of manufacturing a camouflage material based upon such a camouflage pattern, and a camouflage material so manufactured.

SUMMARY OF THE INVENTION

The present invention is a method for forming a camouflage pattern. Such a method includes, first, a step of taking a series of photographs in the environment in which the camouflage pattern is intended to be used. A typical setting would include various kinds of foliage, and, in the preferred embodiment, the foliage would include at least oak, poplar and birch trees. Thereafter, images of the photographs are graphically entered into a computer. Typically, this would be accomplished employing a PC. The images of the photographs are then overlain, one on top of the others, in the computer, to form a composite print illustrating the overall camouflage pattern.

The camouflage pattern formed by this process can then be used in manufacturing a camouflage material. In this process, after the photographic images are overlain in the computer, the colors in the images are separated into a plurality of colors which predominate in the composite print. Such color separation is accomplished using the computer. Thereafter, based upon the plurality of individual color prints created by the color separation, a plurality of layer screens are made, each screen corresponding to one of the color prints formed by the color separation. The colors separated during the separation process are then identified. Knowing the colors and acceptable ranges thereof and having the layer screens, the identified colors are screened onto a sheet of material by employing the corresponding layer screens.

In an embodiment of the invention wherein the camouflage material is intended to simulate an environment in which oak, poplar and birch trees are resident, the predominant colors selected from the composite print would, typically, be black, dark green, light green, orange, khaki, and gray.

The invention also includes a camouflage material which could be made in accordance with the method invention. Such a camouflage material would include a repetitive pattern formed by overlaying, one upon another, a plurality of screened color layers. As in the case of the method invention, when the camouflage material is intended to simulate an environment in which oak, poplar and birch trees are resident, the predominant colors comprising the layers of indicia would be black, dark green, light green, orange, khaki and gray. In a specific embodiment of the invention, the black indicia comprising the first layer is distributed throughout the pattern, when the various layers are overlain one upon another, primarily in relatively large splotches.

In the preferred embodiment, the various colors indicated below would be acceptable in the color ranges as indicated.

| COLOR | RANGE |
|---|---|
| Dark Green | PANTONE PROSIM 5747cv and PANTONE PROSIM 5763cv. |
| Light Green | PANTONE PROCESS 307-1 and PANTONE PROCESS 307-6. |
| Orange | PANTONE PROCESS 23-1 and PANTONE PROCESS 23-5. |
| Khaki | PANTONE PROCESS 42-1 and PANTONE PROCESS 42-5. |

It has been found that the particular hues within these ranges, when applied in a laminar, screened-layer format, combine very efficiently to simulate an environment in which oak, poplar and birch trees are resident. Such a camouflage configuration enables an individual to efficiently blend into the environment.

The present invention is thus an improved camouflage material, a method of manufacturing the camouflage material, and a method of forming a camouflage pattern upon which the camouflage material is based. More specific features and advantages obtained in view of those features will become apparent with reference to the DETAILED DESCRIPTION OF THE INVENTION, appended claims, and accompanying figures.

BRIEF DESCRIPTION OF THE DRAWINGS

The file of this patent contains at least one drawing executed in color. Copies of this patent with color drawing will be provided by the Patent and Trademark Office upon request and payment of the necessary fee.

DETAILED DESCRIPTION OF THE INVENTION

Figure 1:
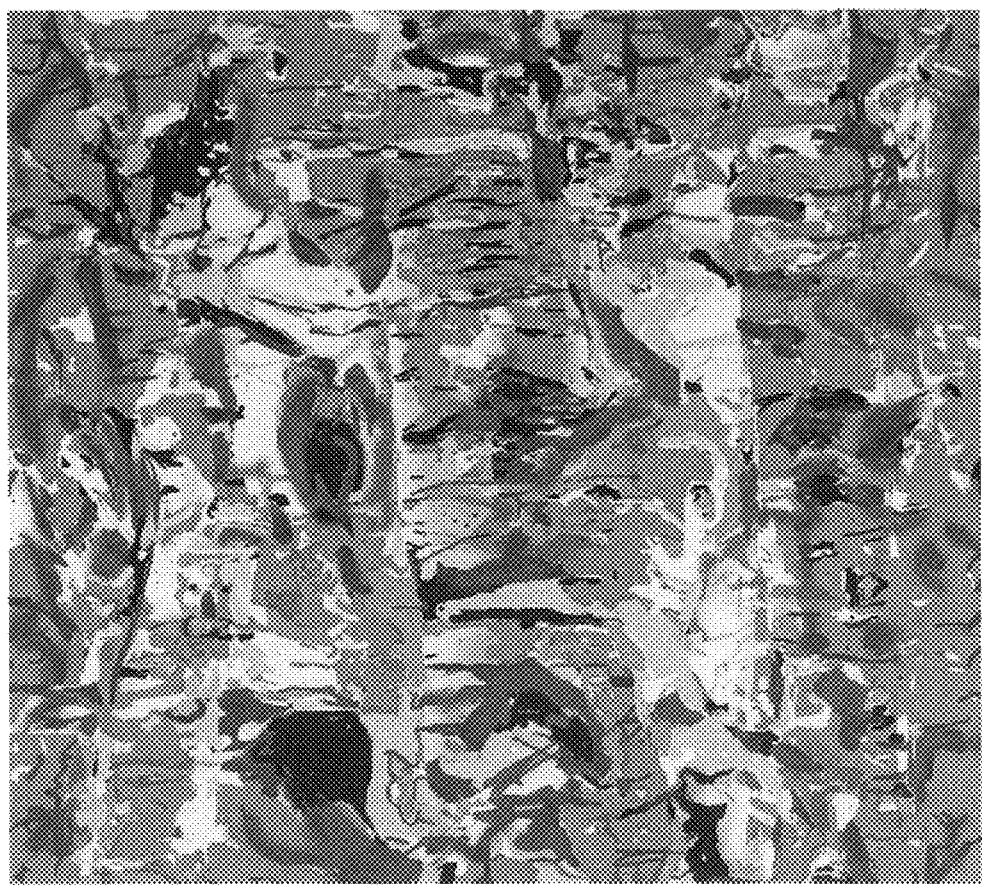
FIG. 1 is a composite print illustrating the camouflage configuration in accordance with the present invention.

Referring now to the figures which illustrate individual color prints (FIGS. 2–7) and a composite print (FIG. 1), FIG. 1 illustrates the overall camouflage configuration in accordance with the present invention. A composite print in accordance with FIG. 1 is formed within a computer. Typically, a PC would be employed for this purpose.

Such a composite print is generated within the computer by entering images of a plurality of photographs taken in a setting illustrating the environment in which the camouflage construction in accordance with the invention would ultimately be used into the computer. The individual photographic images are then overlain, within the computer, one upon the others, to form the composite print.

In further performing a method by which a camouflage material can be manufactured, the colors in the composite print are separated, by the computer, into the various component predominant colors. These individual colors, are, in turn, printed on individual color prints. The individual colors are identified by use of a PANTONE System or some other color hue identification system.

A plurality of layer screens are made in order to deposit the various color layers onto the material. The number of screens employed depends upon the number of individual color prints, and the screens are created so as to position, when the screening function is performed, the individual color at the location on the material the same as where it would be on the individual color print to which the screen corresponds. The individual layers of color can, thereby, be then screened onto the sheet of material, using the layer screens.

Figure 2:
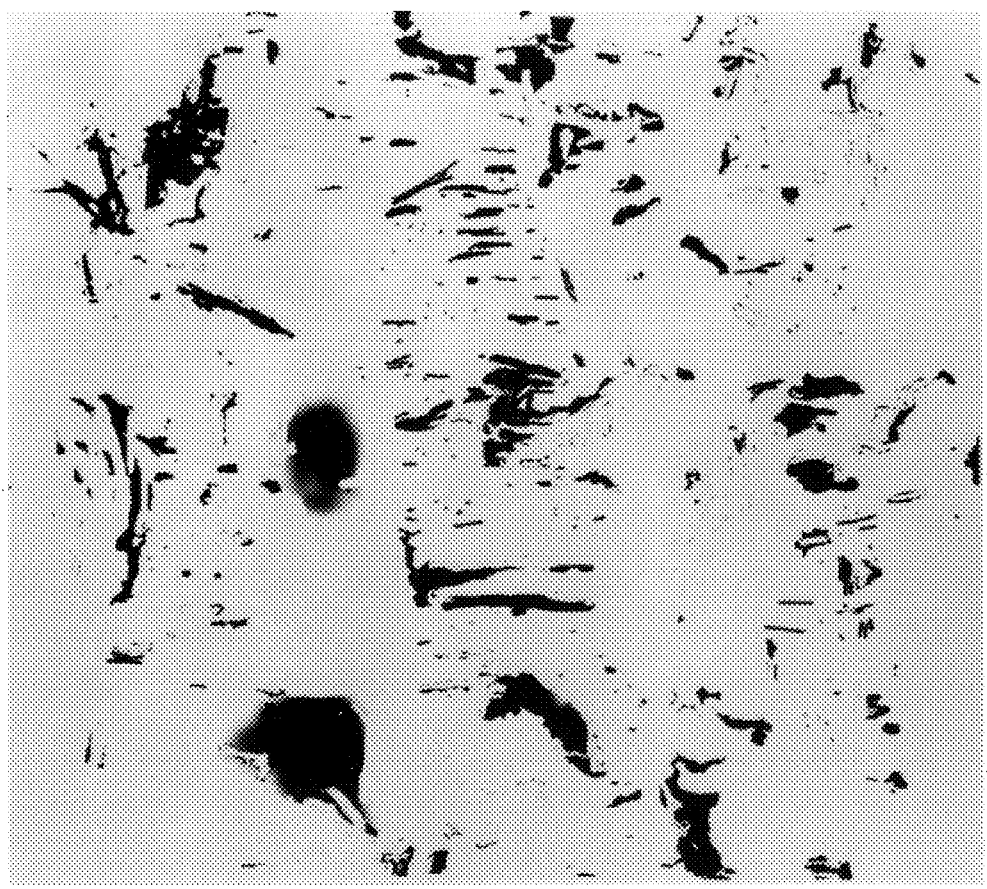
FIG. 2 is an individual layer print illustrating black indicia on a first screened layer.
Figure 3:
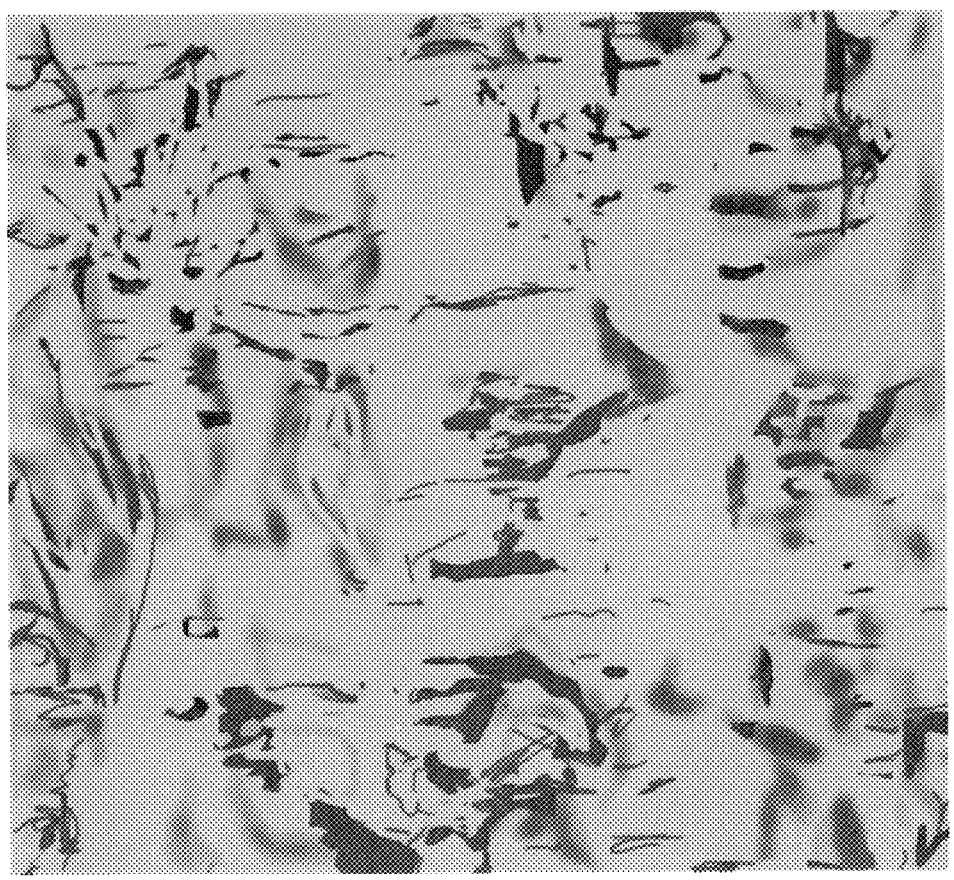
FIG. 3 is an individual layer print illustrating dark green indicia on a second screened layer.
Figure 4:
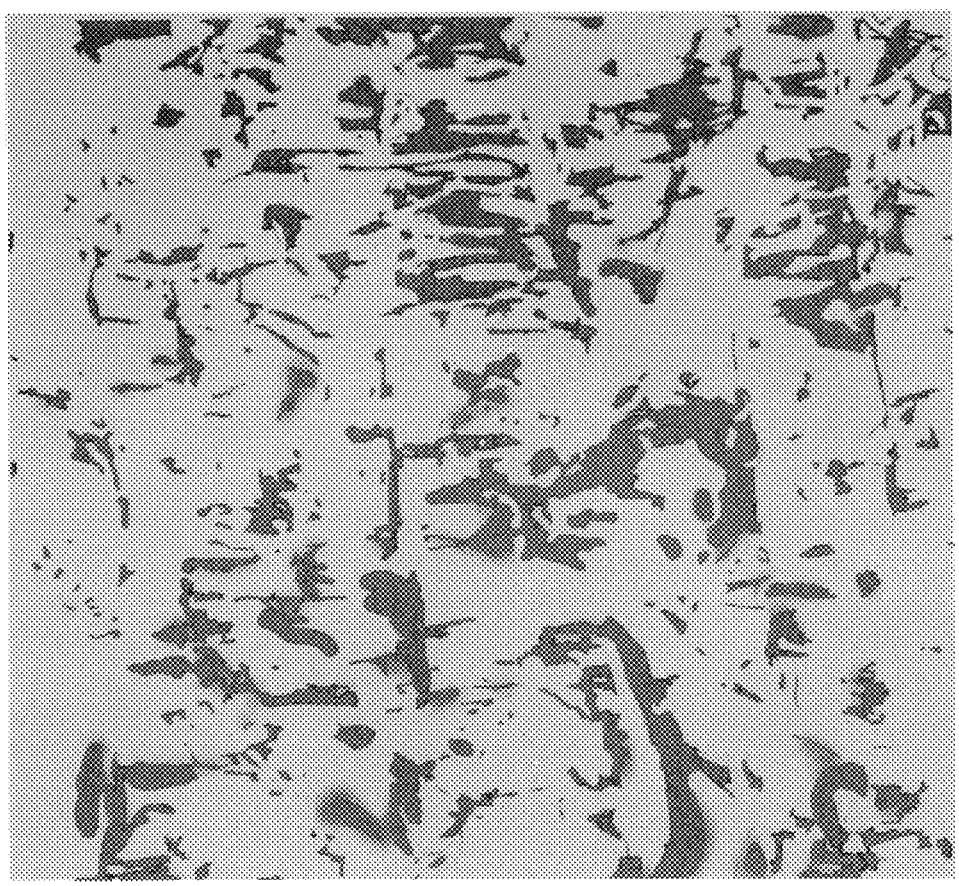
FIG. 4 is an individual layer print illustrating light green indicia on a third screened layer.
Figure 5:
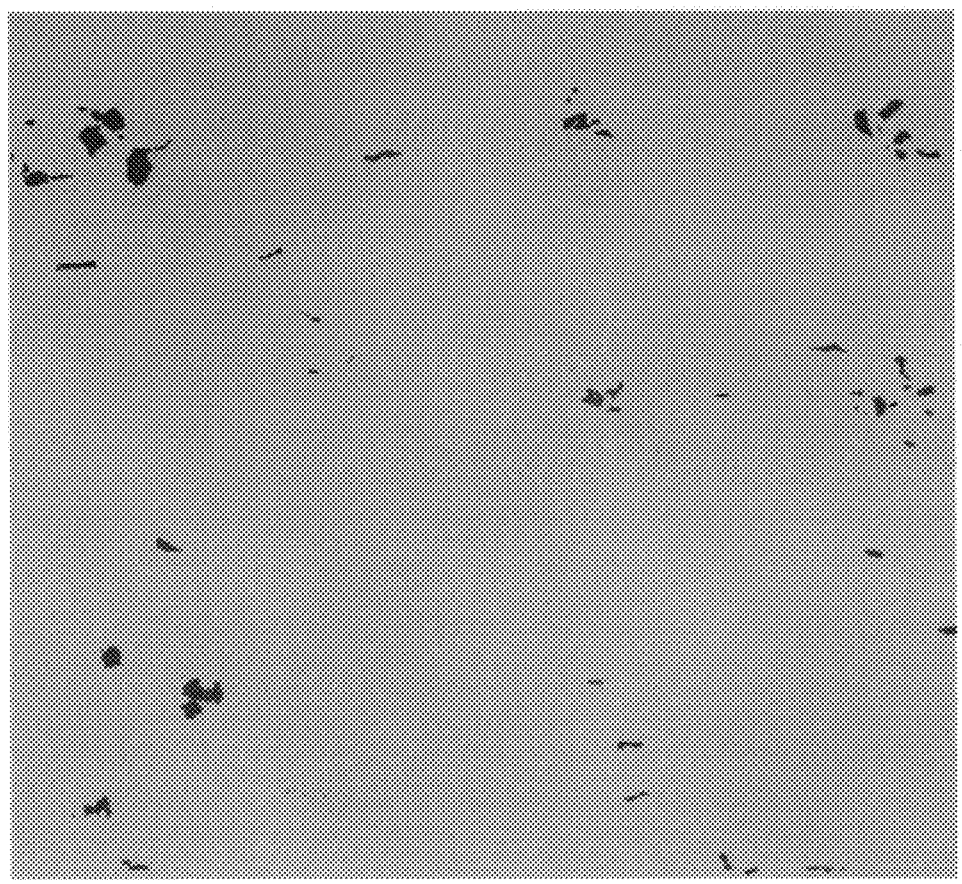
FIG. 5 is an individual layer print illustrating orange indicia on a fourth screened layer.
Figure 6:
FIG. 6 is an individual layer print illustrating khaki indicia on a fifth screened layer.
Figure 7:
FIG. 7 is an individual layer print illustrating gray indicia on a sixth screened layer.

FIGS. 2–7 illustrate the individual color prints, as previously indicated. As can be seen in FIGS. 1 and 2, a black indicia of a first screened layer is disbursed throughout the repetitive pattern formed by adjacent composite prints primarily in relatively large splotches. Conversely, the orange indicia employed in the fourth layer is utilized in relatively small amounts. This particular combination, in association with the dark green, light green, khaki and gray indicia, realistically simulates the environment discussed above.

It has been found that PANTONE color ranges as follows are particularly appropriate for use in manufacturing a camouflage configuration material in accordance with the present invention:

| COLOR | RANGE |
|---|---|
| Dark Green | PANTONE PROSIM 5747cv and PANTONE PROSIM 5763cv. |
| Light Green | PANTONE PROCESS 307-1 and PANTONE PROCESS 307-6. |
| Orange | PANTONE PROCESS 23-1 and PANTONE PROCESS 23-5. |
| Khaki | PANTONE PROCESS 42-1 and PANTONE PROCESS 42-5. |

It will be understood, however, that any specific hue within the range could adequately function for the purpose of simulating the particular environment of the preferred embodiment of the configuration.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A method of manufacturing a camouflage material, comprising the steps of:

(a) taking a series of photographs in a setting including various kinds of foliage, including at least oak, poplar and birch trees;

(b) entering images of the photographs graphically into a computer within the volition of the operator of the computer;

(c) overlaying, in the computer, the images of the photographs upon one another to form a composite print within the volition of the operator of the computer;

(d) color separating, in the computer, the composite print into a plurality of predominant color prints;

(e) making a corresponding plurality of layer screens based upon the plurality of individual color prints;

(f) identifying the colors separated in step (d); and (g) screening the identified colors onto a sheet of material using corresponding layer screens.

2. A method in accordance with claim 1 wherein the colors screened onto the sheet of material in step (g) are black, dark green, light green, orange, khaki and gray.

3. A method in accordance with claim 2 wherein said dark green color is within a range between PANTONE PROSIM 5757cv and PANTONE PROSIM 5763cv.

4. A method in accordance with claim 2 wherein said light green color is within a range between PANTONE PROCESS 307-1 and PANTONE PROCESS 307-6.

5. A method in accordance with claim 2 wherein said orange color is within a range between PANTONE PROCESS 23-1 and PANTONE PROCESS 23-5.

6. A method in accordance with claim 2 wherein said khaki color is within a range between PANTONE PROCESS 42-1 and PANTONE PROCESS 42-5.

\* \* \* \* \*